United States Patent
Kim et al.

(10) Patent No.: US 11,128,348 B2
(45) Date of Patent: Sep. 21, 2021

(54) OPERATING METHOD OF ELECTRONIC DEVICE PERFORMING NEAR FIELD COMMUNICATION FUNCTIONS

(71) Applicant: SAMSUNG ELECTRONICS CO., LTD., Suwon-si (KR)

(72) Inventors: Junwoo Kim, Suwon-si (KR); Wonchurl Jang, Seoul (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 31 days.

(21) Appl. No.: 16/549,938

(22) Filed: Aug. 23, 2019

(65) Prior Publication Data
US 2020/0169297 A1 May 28, 2020

(30) Foreign Application Priority Data

Nov. 22, 2018 (KR) .................. 10-2018-0145241

(51) Int. Cl.
*H04B 5/00* (2006.01)
*G06K 7/10* (2006.01)
*G06K 19/07* (2006.01)

(52) U.S. Cl.
CPC ........ *H04B 5/0062* (2013.01); *G06K 7/10237* (2013.01); *G06K 19/0723* (2013.01)

(58) Field of Classification Search
CPC ............. H04B 5/0062; G06K 7/10237; G06K 19/0723
See application file for complete search history.

(56) References Cited

U.S. PATENT DOCUMENTS

| | | | |
|---|---|---|---|
| 7,717,346 B2 | 5/2010 | Smets et al. |
| 8,060,012 B2 | 11/2011 | Slovsky et al. |
| 8,577,290 B2 | 11/2013 | White |
| 8,670,711 B2 | 3/2014 | Fine et al. |
| 8,831,518 B2 | 9/2014 | Hoeksel et al. |
| 8,913,954 B2 | 12/2014 | Yun et al. |
| 9,122,903 B2 | 9/2015 | Mourtel et al. |
| 9,286,406 B2 | 3/2016 | Kang et al. |
| 9,819,401 B2 | 11/2017 | Karandikar et al. |
| 9,851,703 B2 | 12/2017 | Cataldo et al. |
| 9,876,523 B2 | 1/2018 | Hodroj |
| 2013/0122806 A1 | 5/2013 | Yun |

(Continued)

FOREIGN PATENT DOCUMENTS

| EP | 2365676 A1 | 9/2011 |
|---|---|---|
| JP | 6308313 B2 | 3/2018 |

(Continued)

*Primary Examiner* — Nabil H Syed
(74) *Attorney, Agent, or Firm* — Volentine, Whitt & Francos, PLLC

(57) ABSTRACT

An electronic device performs near field communication (NFC) functions. An operating method of the electronic device includes detecting an attachment of a first NFC tag which uses a first radio frequency signal type (RF signal type), checking whether to exclude the first NFC tag from a recognition of the NFC device in response to the attachment of the first NFC tag, and when the first NFC tag is excluded from the recognition of the NFC device, setting based on the checking a radio frequency signal type of the electronic device so as not to respond to a radio frequency signal of the first radio frequency signal type.

15 Claims, 15 Drawing Sheets

(56) References Cited

U.S. PATENT DOCUMENTS

| | | | | |
|---|---|---|---|---|
| 2014/0197927 A1* | 7/2014 | Kwon | ................... | H04W 48/02 |
| | | | | 340/10.1 |
| 2014/0229377 A1 | 8/2014 | Vakklaganti | | |
| 2017/0026070 A1* | 1/2017 | Hodroj | ................. | A45C 11/182 |
| 2017/0124568 A1 | 5/2017 | Moghadam | | |

FOREIGN PATENT DOCUMENTS

| KR | 20130052830 A | 5/2013 |
|---|---|---|
| KR | 20140110403 A | 9/2014 |
| KR | 20150138672 A | 12/2015 |
| KR | 20170056931 A | 5/2017 |
| KR | 20170097878 A | 8/2017 |

* cited by examiner

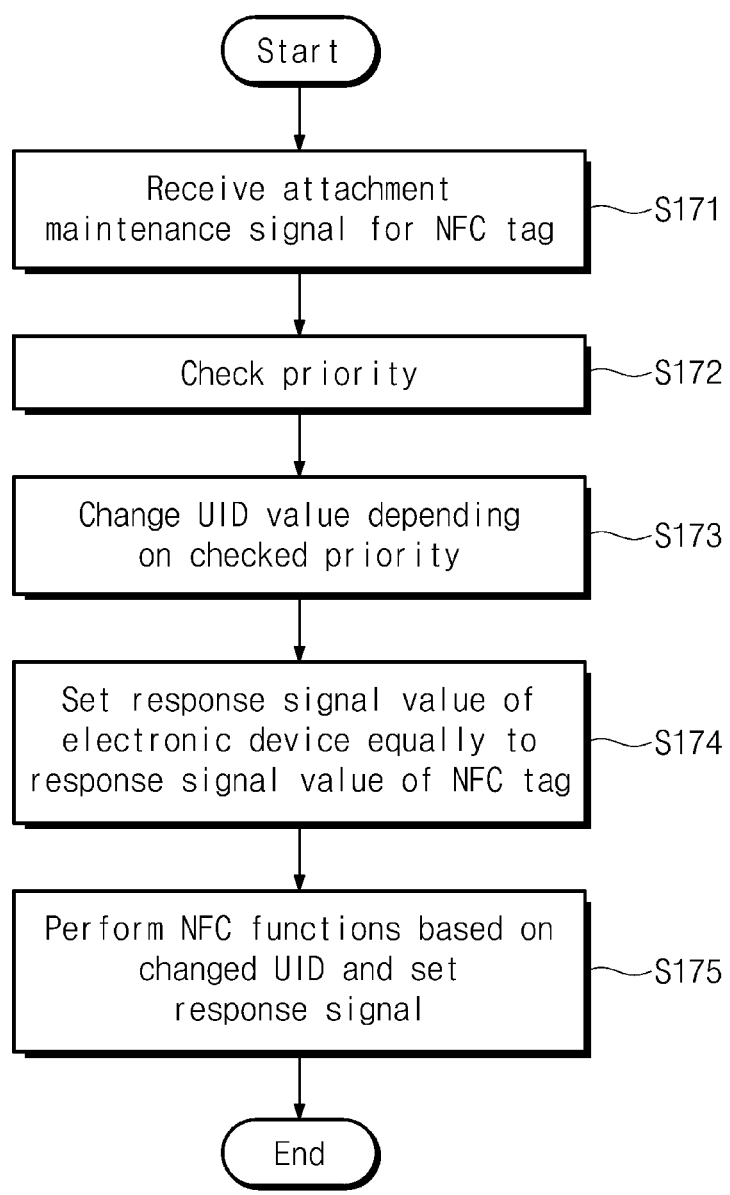

OPERATING METHOD OF ELECTRONIC DEVICE PERFORMING NEAR FIELD COMMUNICATION FUNCTIONS

CROSS-REFERENCE TO RELATED APPLICATIONS

This U.S. non-provisional patent application claims priority under 35 U.S.C. § 119 to Korean Patent Application No. 10-2018-0145241, filed on Nov. 22, 2018 in the Korean Intellectual Property Office, the disclosure of which is incorporated by reference herein in the entirety.

BACKGROUND

1. Field of the Disclosure

Embodiments of the present disclosure relate to an electronic device. More particularly, the present disclosure relates to an operating method of an electronic device that performs near field communication (NFC) functions.

2. Description of the Related Art

Radio frequency identification (RFID) involves an electronic reader using radio waves to read information from a tag. As an example of RFID, an NFC reader placed within a short range from an NFC tag wirelessly supplies a power to the NFC tag and wirelessly communicates with the NFC tag. NFC is used as an example of the RFID. The NFC provides high flexibility in that the NFC may allow an electronic device to perform various functions. For example, the NFC may allow the electronic device to perform a reader/writer function, a peer to peer (P2P) function, and a card emulation function. In a reader/writer mode, the electronic device may behave as a reader for NFC tags, and may detect a proximate NFC tag by using a mechanism known as collision avoidance. The electronic device can read data from or write data to the detected NFC tag. In P2P mode, the electronic device may exchange information with another proximate electronic device such as to conduct an exchange via communication. In a card emulation mode, the electronic device may emulate a contactless smart card so that a separate NFC reader creates the RF field instead of the electronic device.

Separately, there is an increasing number of users who use electronic devices in a state where radio frequency cards (RF cards) such as credit cards or transportation cards are inserted in cases mounted on the electronic devices. In such electronic devices, as the radio frequency card (RF card) inserted in the case operates as an NFC tag, various issues may occur when the electronic device performs NFC functions. When the electronic device performs the reader/writer function, the electronic device may fail to recognize another NFC tag attempting to access the electronic device. Alternatively, when the electronic device approaches to the NFC reader while the card emulation function of the electronic device is turned on, the NFC reader may fail to recognize the electronic device and the RF card separately. As a result, both the electronic device and the RF card may not be read by the NFC reader. In other words, the electronic device and the inserted RF card may present a conflict with one another, or with another nearby RF card or other NFC-enabled device. Due to the above issue, the user separates the RF card and the electronic device to use either the RF card or the electronic device alone, or utilizes the RF card in a state where the NFC function of the electronic device is turned off.

SUMMARY

Embodiments of the present disclosure provide an electronic device which may perform NFC functions in a situation where an NFC tag approaches the electronic device.

According to an exemplary embodiment, an electronic device includes a near field communication (NFC) device. An operating method of the electronic device includes detecting an attachment of a first NFC tag which uses a first radio frequency signal type and checking whether to exclude the first NFC tag from a recognition of the NFC device in response to the attachment of the first NFC tag. When the first NFC tag is to be excluded from the recognition of the NFC device, the operating method of the electronic device includes setting based on the checking a radio frequency signal type of the electronic device so as not to respond to a radio frequency signal of the first radio frequency signal type.

According to another exemplary embodiment, an electronic device includes a near field communication (NFC) device. An operating method of the electronic device includes detecting an attachment of a first NFC tag and checking whether to exclude the first NFC tag from a recognition of the NFC device in response to the attachment of the first NFC tag. The operating method also includes storing based on the checking first radio frequency information of the first NFC tag when the first NFC tag is to be excluded from the recognition of the NFC device. When second radio frequency information is received from a second NFC tag, the operating method includes communicatively connecting to the second NFC tag based on a result of comparing the received second radio frequency information and the stored first radio frequency information.

According to yet another exemplary embodiment, an electronic device includes a near field communication (NFC) device. An operating method of the electronic device includes detecting an attachment of an NFC tag and checking a priority of the NFC tag and the electronic device in response to the attachment of the NFC tag. The operating method also includes changing a value of a unique identifier of the electronic device to a changed unique identifier and setting a value of a first response signal of the electronic device to a set first response signal equal to a value of a second response signal of the NFC tag, depending on the checked priority. The operating method further includes responding to a radio frequency signal from an NFC reader based on the changed unique identifier and the set first response signal.

BRIEF DESCRIPTION OF THE FIGURES

The above and other objects and features of the present disclosure will become apparent by describing in detail exemplary embodiments thereof with reference to the accompanying drawings.

FIG. 12 is a flowchart illustrating another embodiment of an operation of an electronic device of FIG. 1 when an attachment of an NFC tag is maintained.

DETAILED DESCRIPTION

Below, embodiments of the present disclosure may be described in detail and clearly to such an extent that one of ordinary skill in the art easily implements the inventive concept(s) described herein.

In the specification, the term "communicatively connect" may be taken to mean that a communication path is established, such as when a first device (or a first component) communicatively connects to a second device (or a second component). In this case, the first device may receive data from the second device and may send data to the second device via the communication path that results from the communicative connection. The "data" may be distinguishable from various signals which are transmitted/received between the first device and the second device to establish the communicative connection. That is, in the specification, the "data" may mean signals which are transmitted/received between the first device and the second device after the first device and the second device are communicatively connected.

In the specification, that a near field communication (NFC) tag is "attached" to an electronic device may be taken to mean a state where the NFC tag approaches to the electronic device such that the NFC tag may communicate with the electronic device based on the NFC once the NFC tag is sufficiently proximate to the electronic device. This may include direct physical contact, but direct physical contact is not required. Even though the NFC tag is attached to the electronic device, any other object may be placed between the NFC tag and the electronic device, and the NFC tag does not have to directly contact the electronic device in order to communicate with the electronic device based on the NFC.

In the specification, that the first device (or the first component) "approaches" to the second device (or the second component) means that the first device is placed within a near-field wireless communication distance from the second device. As such, when the first device approaches to the second device, the first device may communicate with the second device. Typical near-field wireless communication distances are on the order of two inches, 3-4 centimeters or similar relatively small distances for communications. Since an NFC tag may be powered inductively by an NFC reader, the wireless communication distances between the NFC tag and the NFC reader may be limited to ranges comparable to a size of an antenna coil in the NFC reader.

Figure 1:
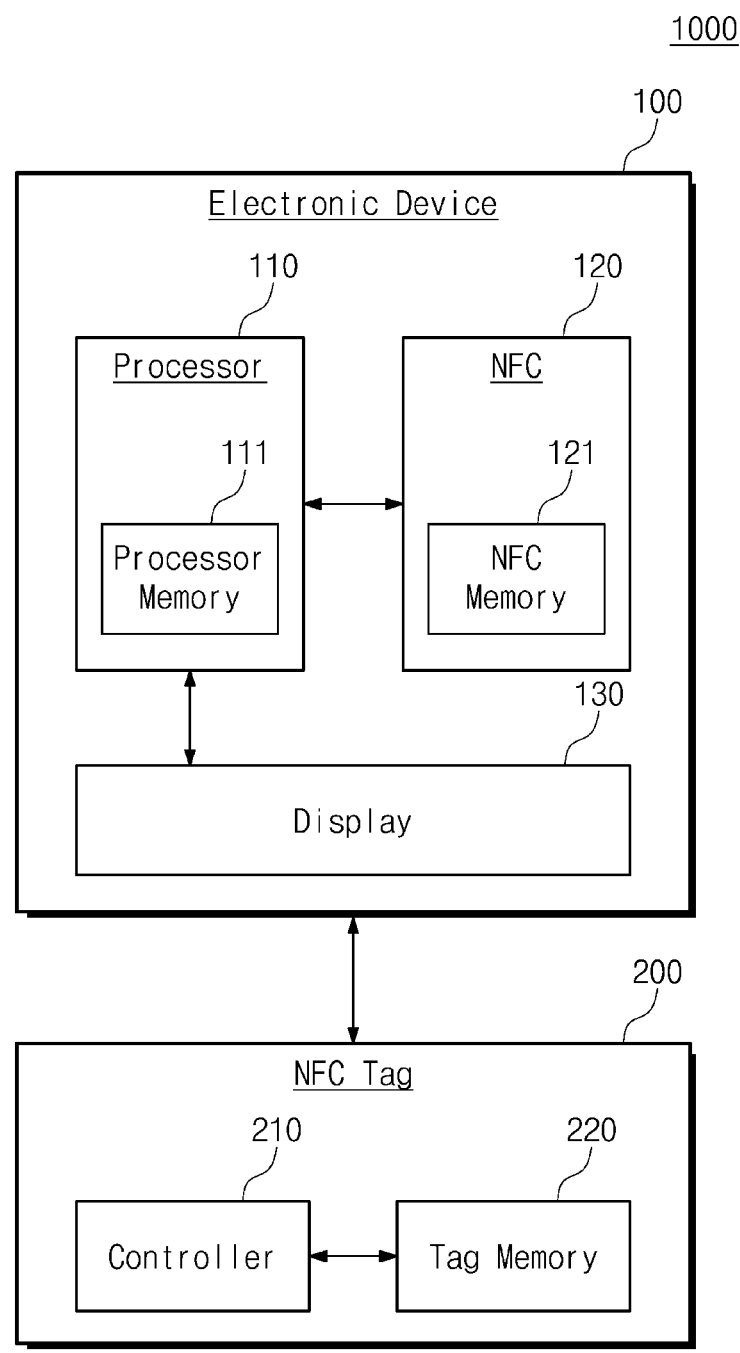
FIG. 1 is a block diagram illustrating an NFC environment according to one embodiment of the present disclosure.
Figure 2:
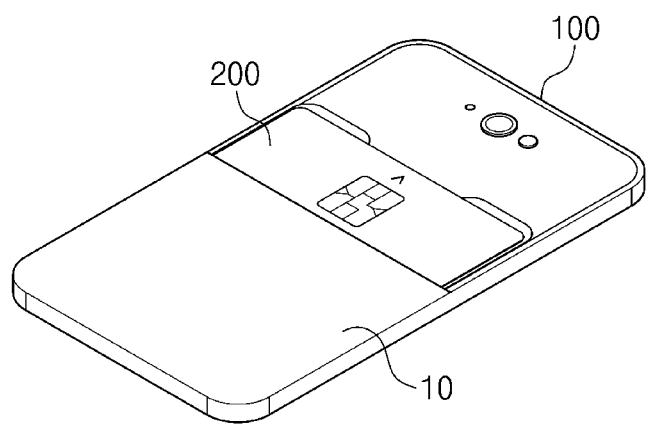
FIG. 2 is a diagram illustrating an example of an electronic device and an NFC tag of FIG. 1.

FIG. 1 is a block diagram illustrating an NFC environment 1000 according to one embodiment of the present disclosure. FIG. 2 is a diagram illustrating an example of an electronic device 100 and an NFC tag 200 of FIG. 1.

Referring to FIG. 1, the electronic device 100 and the NFC tag 200 exist in the NFC environment 1000. The NFC tag 200 may be attached to the electronic device 100. In this case, the electronic device 100 may communicate with the NFC tag 200. For example, as illustrated in FIG. 2, the electronic device 100 may be a smartphone, and the NFC tag 200 may be a radio frequency card (RF card) with a card shape. When the electronic device 100 is a smartphone, the electronic device may be configured to communicate wirelessly according to one or more wireless protocols and standards such as long-term evolution (LTE) or 5G, in addition to having NFC functionality as described herein. A case 10 in which the NFC tag 200 of a card shape may be inserted may be mounted within or otherwise on the electronic device 100. In the embodiments in which the NFC tag 200 is inserted in the case 10 mounted on the electronic device 100, the NFC tag 200 may be attached to the electronic device 100, and the attachment may be based on the insertion.

As described herein, an electronic device generally and the electronic device 100 specifically may be implemented with various kinds of electronic devices, and an NFC tag generally and the NFC tag 200 specifically may be implemented in various forms so as to communicate with the electronic device 100 based on the NFC. In addition to embodiments in which the electronic device 100 is a smartphone, the electronic device may also be, for example, implemented with one of a desktop computer, a laptop computer, a tablet computer, a wearable device, a vehicle, a workstation, a server, a medical device, a camera, a credit transaction device such as a modified credit card reader, and/or an Internet of Things (IoT) product. For example, the NFC tag 200 may be implemented in the form of a key ring, an electronic card, or a sticker.

An example in which the NFC tag 200 is attached to the electronic device 100 through the case 10 mounted on the electronic device 100 is illustrated, but the present disclosure is not limited thereto. For example, in embodiments in which the NFC tag 200 is mounted on the electronic device 100 in the form of a key ring, the NFC tag 200 may be attached to the electronic device 100. That is, the NFC tag 200 may be attached to the electronic device 100 in various manners including by connecting the NFC tag 200, inserting the NFC tag 200, fastening the NFC tag 200 or otherwise.

Each of the electronic device 100 and the NFC tag 200 may support various kinds of radio frequency (RF) communication protocols. For example, each of the electronic device 100 and the NFC tag 200 may support an RF communication protocol of at least one of ISO14443 Type A (hereinafter referred to as "Type A"), ISO14443 Type B (hereinafter referred to as "Type B"), and Felica (hereinafter referred to as "Type F"). In this case, the electronic device 100 may support all of these three RF signal types (Type A, Type B, and Type F), and the NFC tag 200 may support one of the three RF signal types. However, the present disclosure is not limited thereto. For example, each of the electronic device 100 and the NFC tag 200 may support a fourth RF signal type in addition to the three RF signal types (Type A, Type B, and Type F), and the NFC tag 200 may support a plurality of RF signal types. As described herein, different RF signal types may differ by using different communication protocols, or by other differences. For example, one type of RF signal type may only send one type of information on request, whereas another type of RF signal type may broadcast the same kind of information as a beacon or initially when a communication exchange is initiated. RF signal types may also include different modulation such as 100% ASK modulation or 10% ASK modulation.

Below, for convenience of description, the electronic device 100 may support the three RF signal types (Type A, Type B, and Type F), and the NFC tag 200 may support Type A. In this case, the electronic device 100 and the NFC tag 200 may communicate with each other based on Type A and may fail to communicate with each other based on any other RF signal types.

The electronic device 100 may provide NFC functions in a state where the NFC tag 200 is attached to the electronic device 100. For example, the electronic device 100 may provide a reader/writer function, a peer to peer (P2P) function, and a card emulation function.

When the electronic device 100 performs the reader/writer function (hereinafter referred to as a "reader mode"), the electronic device 100 may operate as an NFC reader. In the reader mode, the electronic device 100 may generate an RF signal of an electromagnetic wave form and may send the generated RF signal. The NFC tag 200 may receive an RF signal sent from the electronic device 100 and may respond to the received RF signal. The electronic device 100 may communicatively connect to the NFC tag 200 based on a response signal of the NFC tag 200. In the communicatively connected state, the electronic device 100 may read data stored in the NFC tag 200 or may write data in the NFC tag 200.

In a reader mode, the electronic device 100 may send an RF signal periodically. As illustrated in FIG. 2, when the NFC tag 200 maintains an attached state, the NFC tag 200 may repeatedly send a response signal to the sent RF signal from the electronic device 100. In this case, the electronic device 100 may notify the user of a long-term attachment (i.e., a status) of the NFC tag 200 and may receive an attachment maintenance signal, which is associated with whether to maintain the attachment of the NFC tag 200, from the user. When the attachment maintenance signal is received, the electronic device 100 may determine that the NFC tag 200 will be continuously attached to the electronic device 100.

As one embodiment, the electronic device 100 may determine whether to exclude the NFC tag 200 from NFC recognition in response to the attachment maintenance signal from the user. To exclude the NFC tag 200 from the NFC recognition may mean that the NFC tag 200 is not communicatively connected with the electronic device 100 anymore. As such, when the NFC tag 200 is determined as being excluded from the NFC recognition, the electronic device 100 may stop communicating with the NFC tag 200 and may not communicatively connect to the NFC tag 200 anymore due to the exclusion. In order to exclude the NFC tag 200, the electronic device 100 may communicatively disconnect from the NFC tag 200, may ignore communications from the NFC tag 200, and/or may inform the NFC tag 200 that communications with the NFC tag 200 is not recognized. Exclusion may be implemented by setting an RF signal type of the electronic device 100 so as not to respond to an RF signal of the type from the excluded NFC tag 200

As another embodiment, the electronic device 100 may terminate the reader mode in response to the attachment maintenance signal. That is, the electronic device 100 may turn off the reader/writer function. In this case, the electronic device 100 may not communicatively connect to the NFC tag 200 at least in the reader mode.

When the electronic device 100 performs the card emulation function (hereinafter referred to as a "card mode"), the electronic device 100 may operate as an NFC tag. In the card mode, the electronic device 100 may maintain a response hold state capable of responding to an electromagnetic wave (i.e., an RF signal) sent from a separate NFC reader. When the electronic device 100 receives the RF signal sent from the separate NFC reader, the electronic device 100 may send a response signal to the NFC reader in response to the received RF signal. As such, the separate NFC reader may communicatively connect to the electronic device 100. In the communicatively connected state, the separate NFC reader may read data stored in the electronic device 100 or may write data in the electronic device 100. The electronic device 100 may maintain a response hold state in a state where the electronic device 100 does not approach to the separate NFC reader.

When the electronic device 100 performs the P2P function (hereinafter referred to as a "P2P mode"), the electronic device 100 may communicate with any other electronic device and may exchange data. In the P2P mode, when the electronic device 100 sends data, the electronic device 100 may operate similarly to the reader mode. When the electronic device 100 receives data, the electronic device 100 may operate similarly to the card mode. Accordingly, for convenience of description, NFC functions of the electronic device 100 will be described below with respect to the reader mode or the card mode of the electronic device 100.

Referring to FIG. 1, to provide NFC functions, the electronic device 100 may include a processor 110, an NFC chip 120, and a display 130. The processor 110 may control overall operations of the electronic device 100. For example, the processor 110 may include at least one of a central processing unit (CPU), an application processor (AP), and a communication processor (CP). The processor 110 may execute instructions, for example in the form of middleware, to perform part or all of various methods described herein.

The processor 110 may control an operation of the NFC chip 120 such that the electronic device 100 performs an NFC function. For example, the processor 110 may control the NFC chip 120 such that the electronic device 100 operates in the reader mode and may control the NFC chip 120 such that the electronic device 100 operates in the card mode. To control the NFC chip 120, the processor 110 may drive software. For example, the processor 110 may drive NFC middleware. The NFC middleware may send a command to the software or firmware of the NFC chip 120 and may control an operation of the NFC chip 120. The NFC middleware may be stored in a processor memory 111, but the present disclosure is not limited thereto.

The processor 110 may control an operation of the display 130. The processor 110 may output information, which is generated according to an operation of the software (e.g., an application) or an operating system of the electronic device 100, through the display 130.

The NFC chip 120 may perform an NFC function under control of the processor 110. In the reader mode, the NFC chip 120 may send an RF signal under control of the processor 110. The sent RF signal may include a command (hereinafter referred to as an "RF information request command") requesting RF information. The RF information may include preset unique information of an NFC tag which may be obtained from a response signal of the NFC tag. For example, the RF information may include an ATQA (Answer to Request: Type A), an ATQB (Answer to Request: Type B), an UID (Unique Identifier), a SAK (Select Acknowledgement), an RF signal type, etc.

For example, in embodiments in which the NFC chip 120 sends an RF signal based on Type A, the NFC chip 120 may send a command, such as REQA (Request Type A), anti-collision, or SELECT, as the RF information request command. The NFC chip 120 may receive RF information of an NFC tag as a response signal to the RF information request command. The received RF information is received from the NFC tag, and may be considered first RF information. In this case, the NFC tag may be an NFC tag which operates based on Type A. The NFC chip 120 may receive the ATQA, the UID, the SAK, etc. as RF information of the NFC tag from the NFC tag. Here, the ATQA may be a response signal to the REQA command, the UID may be a response signal to the anti-collision command, and the SAK may be a response signal to the SELECT command. The UID may be information indicating a unique ID of the NFC tag, and different NFC tags may have different UIDs. Since the ATQA and the SAK include information about the UID, different NFC tags may send the different ATQA and the different SAK as a response signal.

The NFC chip 120 may communicatively connect to the NFC tag based on the received RF information. When the NFC chip 120 communicatively connects to the NFC tag, the processor 110 may read data from the NFC tag or may write data in the NFC tag.

In the card mode, the NFC chip 120 may respond to the RF signal sent from the separate NFC reader under control of the processor 110. In response to the RF signal, the NFC chip 120 may send RF information of the electronic device 100 to the separate NFC reader. The NFC chip 120 may send RF information including the UID stored in an NFC memory 121 to the separate NFC reader. For example, the UID of the electronic device 100 may be output from a separate secure element (e.g., a universal subscriber identity module (USIM)) and may be stored in the NFC memory 121. The separate NFC reader may communicatively connect to the electronic device 100 based on the received RF information.

For example, the NFC chip 120 may drive the NFC firmware for the purpose of performing the NFC function. The NFC firmware may operate in compliance with a command of the NFC middleware. The NFC firmware may be stored in the NFC memory 121 of the NFC chip 120, but the present disclosure is not limited thereto.

The display 130 may display various information under control of the processor 110. For example, the display 130 may display various content, such as a text, an image, a video, an icon, and/or a symbol, to a user. In embodiments in which the display 130 is implemented with a touch screen display, the electronic device 100 may receive a user input through the display 130. However, the present disclosure is not limited thereto. For example, the electronic device 100 may receive a user input from any other input means. The user input may be received directly from a user such as by voice or touch via a touch panel, a touch screen, a button, and a key pad. The user input may also be received indirectly from a user, such as by an optical sensor, a proximity sensor, a gyroscope sensor, and a pressure sensor.

The NFC tag 200 may include a controller 210 and a tag memory 220. The controller 210 may control overall operations of the NFC tag 200. For example, in the reader mode of the electronic device 100, the controller 210 may allow or even control the NFC tag 200 to send, to the electronic device 100, a response signal to the RF signal received from the electronic device 100.

The tag memory 220 may store RF information of the NFC tag 200. For example, the tag memory 220 may store an UID of the NFC tag 200. When the RF signal is received from the electronic device 100, the NFC tag 200 may send RF information including the UID stored in the tag memory 220 to the electronic device 100.

When the NFC tag 200 is attached to the electronic device 100, in the reader mode of the electronic device 100, the NFC tag 200 may send the RF information in response to the RF signal received from the NFC chip 120. When the NFC tag 200 is continuously attached, the NFC tag 200 may repeatedly send the RF information. In this case, the processor 110 may display a notification associated with a long-term attachment of the NFC tag 200 through the display 130 and may display a check message for determining whether to maintain the attachment of the NFC tag 200. When the attachment maintenance signal is received from the user, the processor 110 may determine that the NFC tag 200 will be continuously attached to the electronic device 100. In this case, the processor 110 may store the RF information of the NFC tag 200 in the processor memory 111.

As one embodiment, the processor 110 may display, through the display 130, a check message for determining whether to exclude the NFC tag 200 from NFC recognition in response to the attachment maintenance signal. When the exclusion of the NFC tag 200 from the NFC recognition is checked by the user, the processor 110 may change settings of the NFC chip 120. The NFC chip 120 may operate depending on the changed settings in the reader mode and the card mode. In the reader mode, the NFC chip 120 may recognize a different NFC tag and may communicatively connect to the different NFC tag. In the card mode, the NFC chip 120 may communicatively connect to the separate NFC reader without collision between the NFC chip 120 and the NFC tag 200.

As another embodiment, the processor 110 may terminate the reader mode in response to the attachment maintenance signal and may display a check message for determining priorities of the electronic device 100 and the NFC tag 200. For example, when the electronic device 100 and the NFC tag 200 compete with one another in the view of a separate NFC reader, a relative priority of the electronic device 100 and the NFC tag 200 may be set to determine which should communicate with the separate NFC reader and which should be excluded. A priority may indicate information reflecting that the user has selected one of the electronic device 100 and the NFC tag 200 to have priority over the other, to settle the conflict presented by the two accompanying one another in the view of the separate NFC reader. The electronic device 100 or the NFC tag 200 selected as the priority may first communicatively connect to the separate NFC reader. The processor 110 may change settings of the NFC chip 120 based on the priority selected by the user. The NFC chip 120 may operate depending on the changed settings in the card mode. In this case, one of the NFC chip 120 and the NFC tag 200 may communicatively connect to the separate NFC reader depending on the priority. For practical purposes, this eliminates the conflict between the electronic device 100 and the NFC tag 200 due to the two accompanying one another in the view of the separate NFC reader As described above, the electronic device 100 according to an embodiment of the present disclosure may perform NFC functions while the NFC tag 200 is attached. For example, as illustrated in FIG. 2, when a transportation card is attached to a smartphone, the smartphone may recognize a different NFC tag and may communicatively connect to the different NFC tag. Also, when the smartphone approaches to a transportation card reader, a fare may be paid through the smartphone without collision between the smartphone and the transportation card. Alternatively, when the smartphone approaches to the transportation card reader, a fare may be paid through the transportation card without collision between the smartphone and the transportation card. As such, the electronic device 100 may normally perform NFC functions without separating the attached NFC tag 200 or turning off the NFC function of the electronic device 100.

Below, one example of an operation of the electronic device 100, which allows the electronic device 100 to perform NFC functions normally, will be described with reference to FIGS. 3 and 4.

Figure 3:
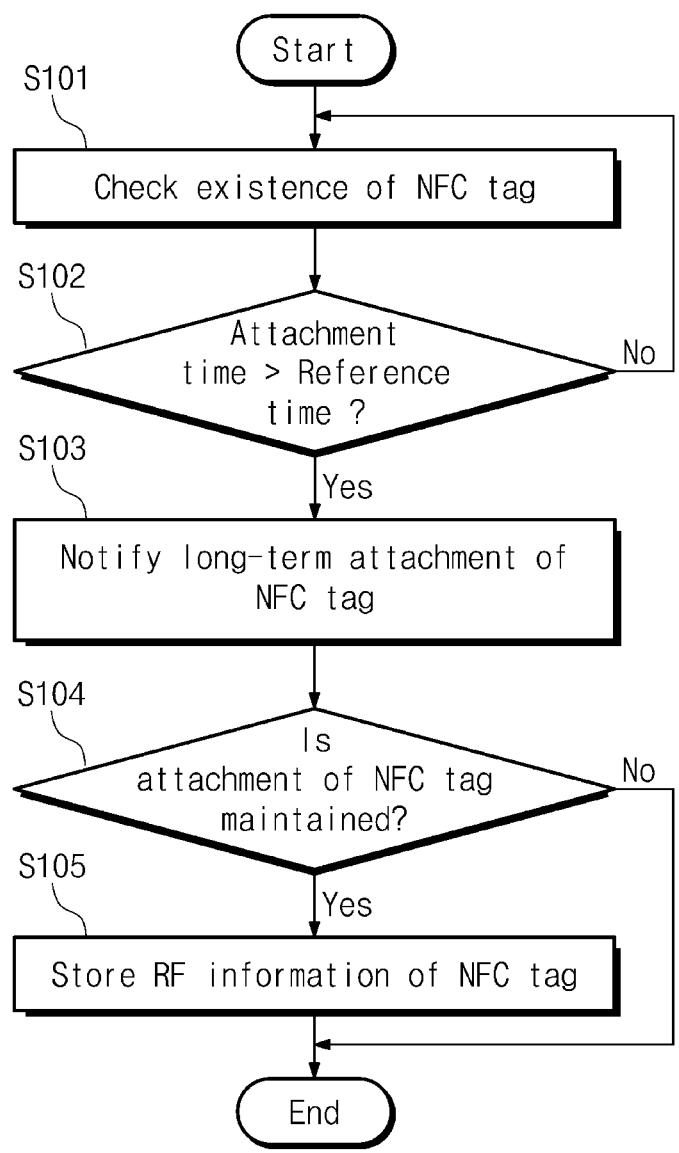
FIG. 3 is a flowchart illustrating an operation in which an electronic device of FIG. 1 determines an attachment of an NFC tag and receives an attachment maintenance signal.

FIG. 3 is a flowchart illustrating an operation in which the electronic device 100 of FIG. 1 determines an attachment of the NFC tag 200 and receives an attachment maintenance signal. Referring to FIGS. 1 and 3, in operation S101, the electronic device 100 may check the existence of the NFC tag 200. In the reader mode, the electronic device 100 may send an RF signal. Upon receiving a response signal from the NFC tag 200, the electronic device 100 may check the existence of the NFC tag 200. As such, the electronic device 100 may determine that the NFC tag 200 is attached. The response signal may include RF information of the NFC tag 200. The electronic device 100 may repeatedly check the existence of the NFC tag 200.

In operation S102, the electronic device 100 may determine whether an attachment time of the NFC tag 200 exceeds a reference time. When the attachment time of the NFC tag 200 exceeds the reference time, in operation S103, the electronic device 100 may notify of a long-term attachment of the NFC tag 200. The electronic device 100 may display the long-term attachment status of the NFC tag 200 through the display 130. When the attachment time of the NFC tag 200 is within the reference time, the electronic device 100 may continue to check the existence of the NFC tag 200.

In operation S104, the electronic device 100 may check whether the attachment of the NFC tag 200 is maintained. The electronic device 100 may display a check message through the display 130 and may receive an input from the user. When the attachment of the NFC tag 200 is to be maintained (i.e., when the attachment maintenance signal is received), in operation S105, the electronic device 100 may store RF information of the NFC tag 200 based on the input from the user responsive to the check message. For example, the RF information of the NFC tag 200 may be stored in the processor memory 111. That is, the electronic device 100 may separately manage the RF information of the NFC tag 200.

Figure 4:
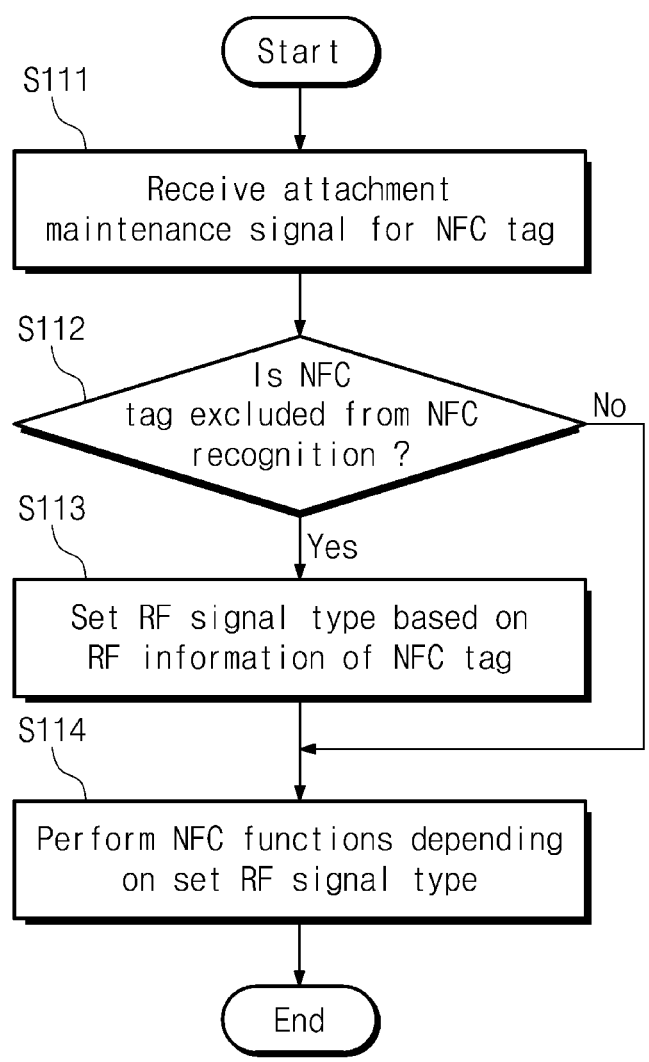
FIG. 4 is a flowchart illustrating one embodiment of an operation of an electronic device of FIG. 1 when an attachment of an NFC tag is maintained.

FIG. 4 is a flowchart illustrating one embodiment of an operation of the electronic device 100 of FIG. 1 when an attachment of the NFC tag 200 is maintained. Referring to FIGS. 1 and 4, in operation S111, the electronic device 100 may receive an attachment maintenance signal associated with the NFC tag 200. As such, the electronic device 100 may determine that the NFC tag 200 will be continuously attached to the electronic device 100.

In operation S112, the electronic device 100 may check whether to exclude the NFC tag 200 from NFC recognition. The check in operation S112 may be based on and in response to the attachment of the NFC tag 200. For example, the electronic device 100 may display a check message through the display 130 and may receive an input of the user. The electronic device 100 may check whether to exclude the NFC tag 200 from NFC recognition based on the user input.

When the NFC tag 200 is determined to be excluded from the NFC recognition based on the check in operation S112, in operation S113, the electronic device 100 may set an RF signal type of the electronic device 100 based on the RF information of the NFC tag 200. The RF information of the NFC tag 200 may be considered first RF information. As described with reference to FIG. 3, the RF information of the NFC tag 200 may be stored in advance. The RF information of the NFC tag 200 may include an RF signal type of the NFC tag 200. The electronic device 100 may set the RF signal type such that the electronic device 100 performs NFC functions based on an RF signal type different from the RF signal type of the NFC tag 200. For example, since the NFC tag 200 operates based on Type A, the electronic device 100 may set the RF signal type such that the electronic device 100 performs NFC functions based on Type B and Type F. The processor 110 may send a command to the NFC chip 120 to set an RF signal type for each mode. For example, the processor 110 may differently set an RF signal type of the reader mode and an RF signal type of the card mode, so that the reader mode operates in one or more first RF signal type(s) and the card mode operates in one or more second RF signal type(s) partially or entirely different from the first RF signal type(s).

In operation S114, the electronic device 100 may perform NFC functions depending on the set RF signal type. For example, in the reader mode, when the RF signal type is set to Type B and Type F, the electronic device 100 may send an RF signal based on Type B and Type F. In the card mode, when the RF signal type is set to Type B and Type F, the electronic device 100 may respond to only an RF signal of Type B and Type F.

When it is determined that the NFC tag 200 is not excluded from the NFC recognition based on the check at S112, in operation S114, the electronic device 100 may perform NFC functions based on a preset RF signal type. For example, the electronic device 100 may operate based on Type A, Type B, and Type F. In this case, since the electronic device 100 and the NFC tag 200 operate based on the same type (Type A), a collision event may occur when the electronic device 100 operates in the card mode. That is, a separate NFC reader may view both the electronic device 100 and the NFC tag 200 when both operate based on the same type of RF signal, and this may constitute a collision event.

Below, an example in which the electronic device 100 operates in the reader mode and the card mode based on the operation of the electronic device 100 described with reference to FIG. 4 will be described with reference to FIGS. 5 to 9.

Figure 5:
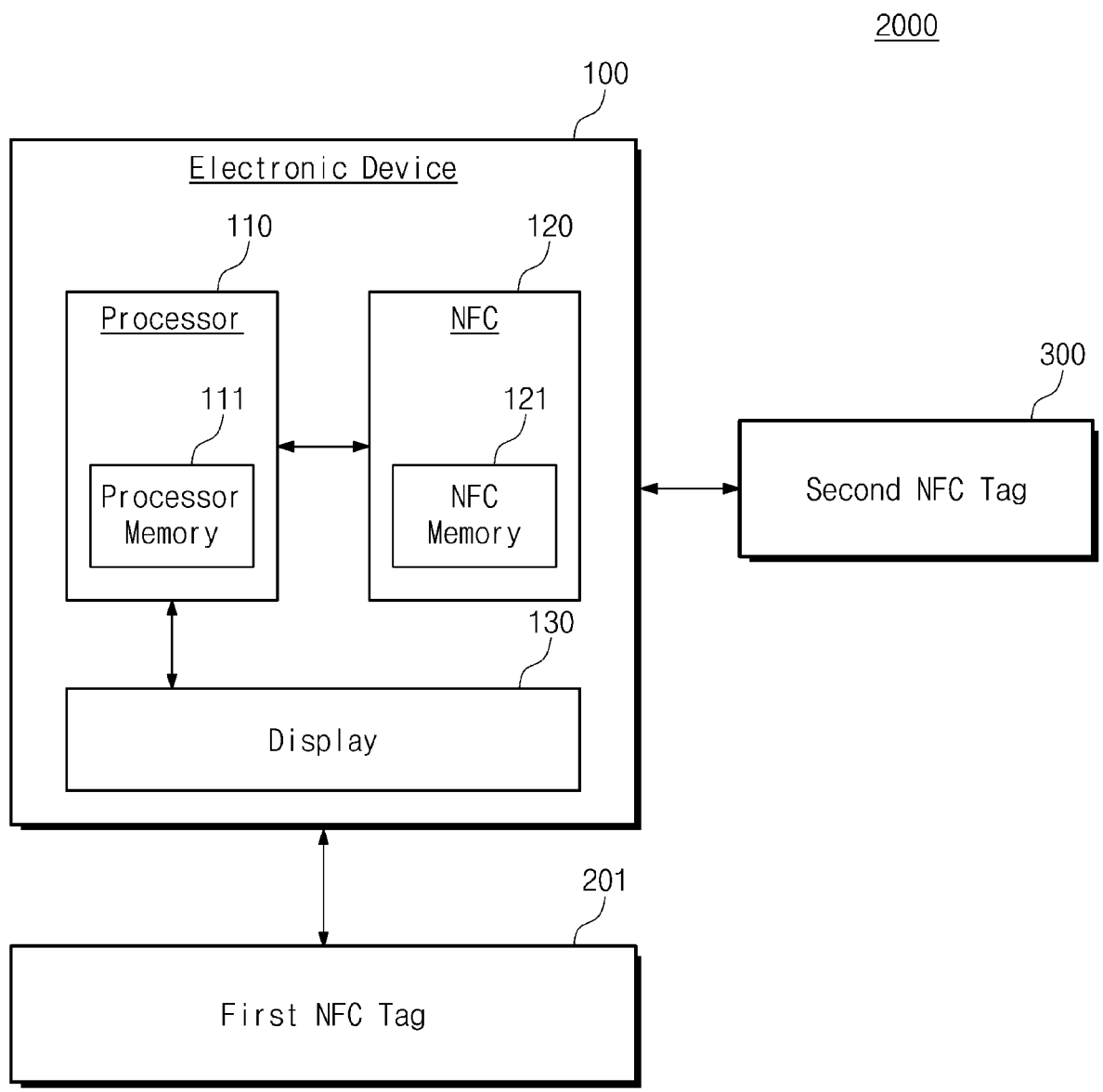
FIG. 5 is a block diagram illustrating an NFC environment according to one embodiment of the present disclosure.

FIG. 5 is a block diagram illustrating an NFC environment 2000 according to one embodiment of the present disclosure. Referring to FIG. 5, the electronic device 100, the first NFC tag 201, and a second NFC tag 300 exist in the NFC environment 2000. In detail, the NFC environment 2000 of FIG. 5 shows an example in which the second NFC tag 300 approaches to the electronic device 100 in a state where the first NFC tag 201 is attached to the electronic device 100. The electronic device 100 and the first NFC tag 201 of FIG. 5 correspond to the electronic device 100 and the NFC tag 200 of FIG. 1, and thus, additional description will be omitted to avoid redundancy.

The second NFC tag 300 may be implemented in various forms. For example, the second NFC tag 300 may be implemented with an electronic device performing various modes, like the electronic device 100. Alternatively, the second NFC tag 300 may be implemented to perform only the card mode like the first NFC tag 201. However, the present disclosure is not limited thereto. The second NFC tag 300 may be implemented with any kind of device or object performing the card mode.

The second NFC tag 300 may send a response signal to the electronic device 100 in response to an RF signal of the electronic device 100. The second NFC tag 300 may provide RF information of the second NFC tag 300 to the electronic device 100 by sending a response signal. The RF information of the second NFC tag 300 may be considered second RF information. The RF information of the second NFC tag 300 may be different from the RF information of the first NFC tag 201. For example, an UID of the second NFC tag 300 may be different from an UID of the first NFC tag 201.

As one embodiment, the second NFC tag 300 may operate based on an RF signal type different from an RF signal type of the first NFC tag 201. As another embodiment, the second NFC tag 300 may operate based on an RF signal type equal to an RF signal type of the first NFC tag 201.

Below, an operation of the electronic device 100 in the reader mode when the second NFC tag 300 approaches to the electronic device 100 will be described with reference to FIG. 6. For convenience of description, it is assumed that the second NFC tag 300 operates based on an RF signal type different from an RF signal type of the first NFC tag 201. For example, the second NFC tag 300 may operate based on Type B or Type F.

Figure 6:
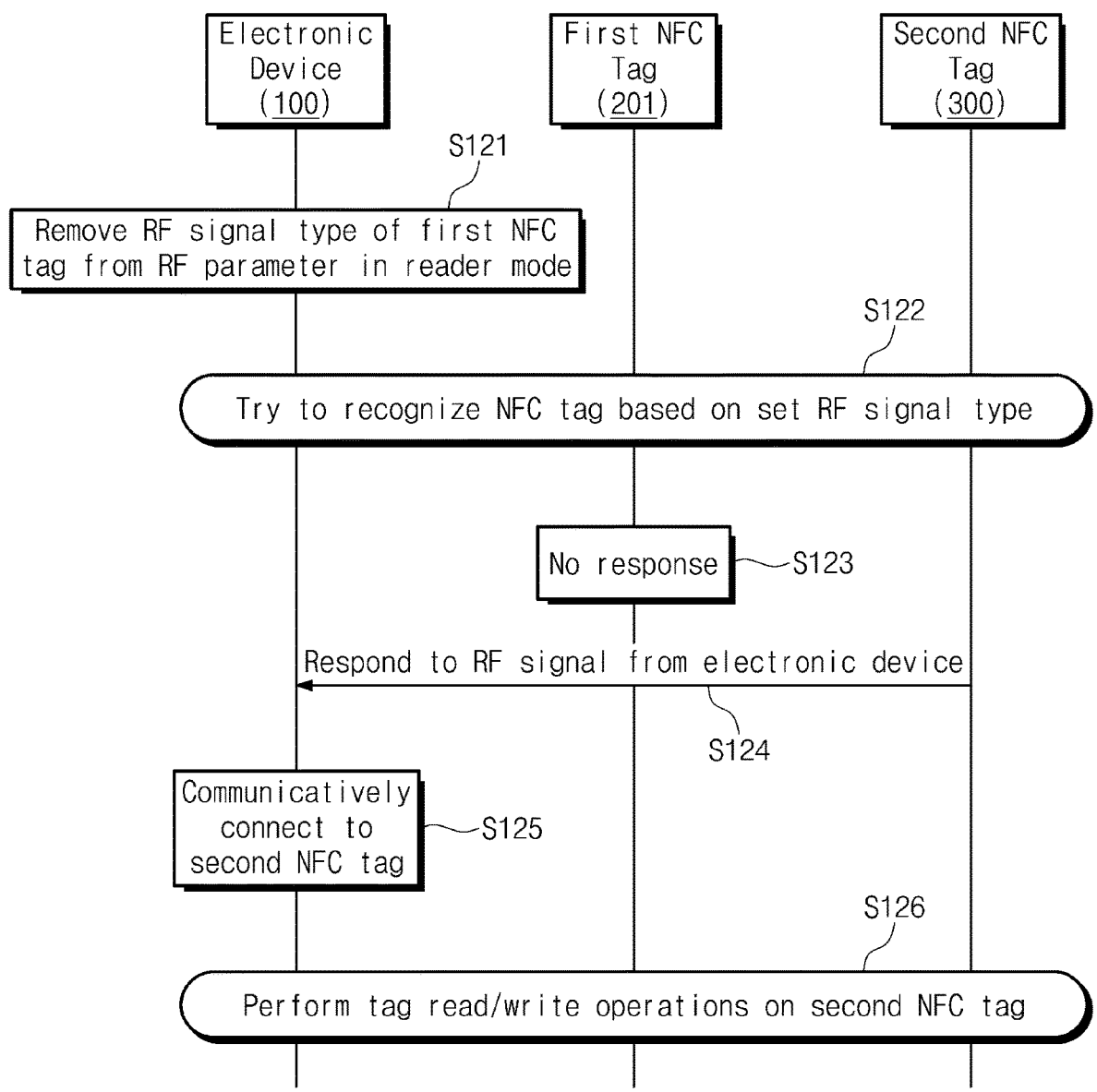
FIG. 6 illustrates an example in which an electronic device operates in a reader mode based on an operation of FIG. 4.

FIG. 6 illustrates an example in which the electronic device 100 operates in the reader mode based on the operation of FIG. 4. Referring to FIGS. 5 and 6, in operation S121, the electronic device 100 may remove an RF signal type of the first NFC tag 201 from an RF parameter in the reader mode. Operation S121 may correspond to operation S113 of FIG. 4. That is, in the reader mode, the electronic device 100 may set an RF signal type such that the electronic device 100 operates based on an RF signal type different from the RF signal type of the first NFC tag 201. As such, the electronic device 100 may perform the reader mode based on Type B and Type F.

In operation S122, the electronic device 100 may try to recognize an NFC tag based on the set RF signal type. In this case, the electronic device 100 may send an RF signal based on Type B and Type F. When the electronic device 100 sends an RF signal, in operation S123, the first NFC tag 201 may not respond to the RF signal from the electronic device 100 because the first NFC tag 201 operates based on Type A. In operation S124, the second NFC tag 300 may respond to the RF signal from the electronic device 100 because the second NFC tag 300 operates based on Type B or Type F.

In operation S125, the electronic device 100 may communicatively connect to the second NFC tag 300 based on a response signal of the second NFC tag 300. In operation S126, the electronic device 100 may perform tag read/write operations on the second NFC tag 300.

As described above, when the electronic device 100 operates based on an RF signal type different from an RF signal type of the first NFC tag 201, the electronic device 100 may recognize the second NFC tag 300 and may communicatively connect to the second NFC tag 300 without colliding with the first NFC tag 201.

A description is given in FIG. 6 as operation S124 is performed after operation S123, but the present disclosure is not limited thereto. For example, operation S123 and operation S124 may be performed independently.

Figure 7:
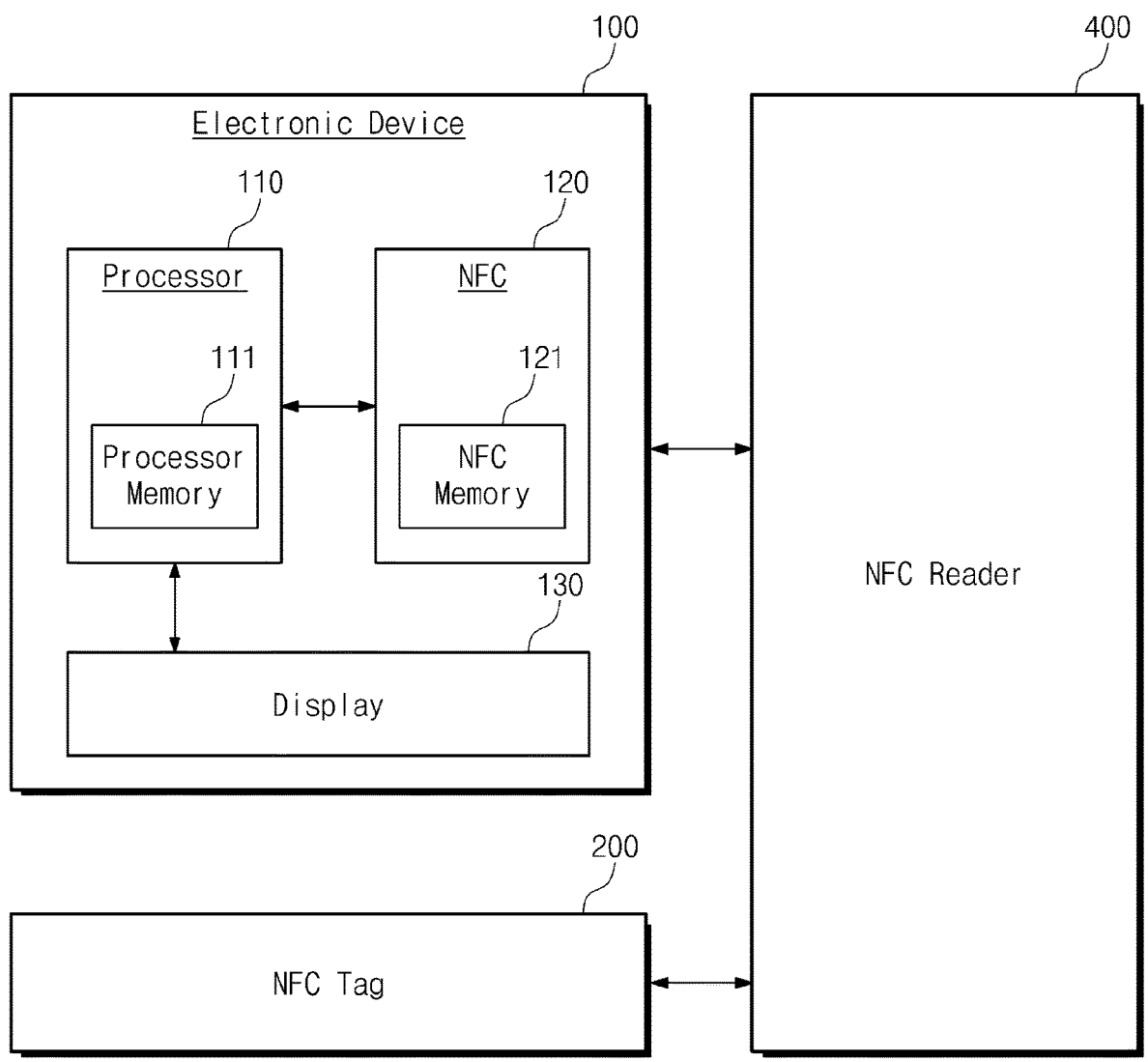
FIG. 7 is a block diagram illustrating an NFC environment according to one embodiment of the present disclosure.

FIG. 7 is a block diagram illustrating an NFC environment 3000 according to one embodiment of the present disclosure. Referring to FIG. 7, the electronic device 100, the NFC tag 200, and an NFC reader 400 exists in the NFC environment 3000. In detail, the NFC environment 3000 of FIG. 7 shows an example in which the electronic device 100 approaches to the NFC reader 400 in a state where the NFC tag 200 is attached to the electronic device 100. The electronic device 100 and the NFC tag 200 of FIG. 7 correspond to the electronic device 100 and the NFC tag 200 of FIG. 1, and thus, additional description will be omitted to avoid redundancy.

The NFC reader 400 may be implemented in various forms of readers. The NFC reader 400 may be implemented with an electronic device performing various modes, like the electronic device 100. Alternatively, the NFC reader 400 may be implemented in various kinds of readers performing only the reader mode. For example, the electronic device 100 may perform various payment operations through the NFC reader 400, but the present disclosure is not limited thereto.

The NFC reader 400 may send an RF signal based on various types. For example, the NFC reader 400 may send an RF signal based on Type A, Type B, and/or Type F. Alternatively, the NFC reader 400 may send an RF signal based on Type B and Type F. However, the present disclosure is not limited thereto.

At least one of the electronic device 100 and the NFC tag 200 may send a response signal in response to the RF signal. The NFC reader 400 may communicatively connect to one of the electronic device 100 or the NFC tag 200 based on the received response signal.

Below, an operation of the electronic device 100 in the card mode when the electronic device 100 approaches to the NFC reader 400 will be described with reference to FIG. 8. For convenience of description, it is assumed that the NFC reader 400 of FIG. 8 operates based on an RF signal type equal to an RF signal type of the NFC tag 200, and it is assumed that the NFC reader 400 of FIG. 9 operates based on an RF signal type different from an RF signal type of the NFC tag 200. For example, the NFC reader 400 of FIG. 8 may operate based on Type A, and the NFC reader 400 of FIG. 9 may operate based on Type B or Type F.

Figure 8:
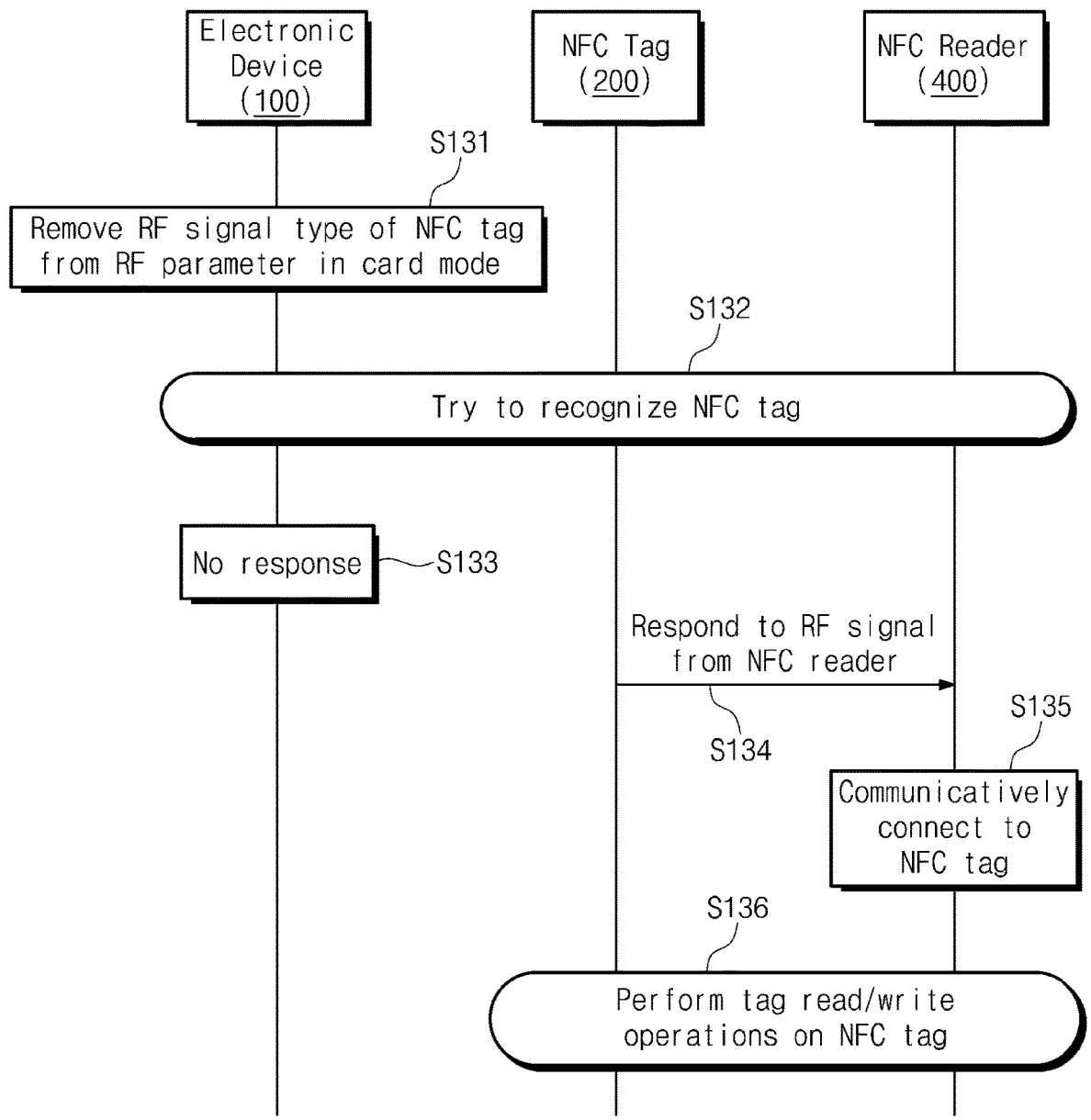
FIG. 8 illustrates an example in which an electronic device operates in a card mode based on an operation of FIG. 4.

FIG. 8 illustrates an example in which the electronic device 100 operates in the card mode based on the operation of FIG. 4. Referring to FIGS. 7 and 8, in operation S131, the electronic device 100 may remove an RF signal type of the NFC tag 200 from an RF parameter in the card mode. Operation S131 may correspond to operation S113 of FIG. 4. That is, in the card mode, the electronic device 100 may set an RF signal type such that the electronic device 100 operates based on an RF signal type different from the RF signal type of the NFC tag 200. As such, the electronic device 100 may perform the card mode based on Type B and Type F, without presenting a collision with the NFC tag 200 in the view of the NFC reader 400.

In operation S132, the NFC reader 400 may try to recognize an NFC tag. In this case, the NFC reader 400 may send an RF signal based on Type A. When the NFC reader 400 sends an RF signal, in operation S133, the electronic device 100 may not respond to the RF signal because the electronic device 100 operates based on Type B or Type F. In operation S134, the NFC tag 200 may respond to the RF signal from the NFC reader 400 because the NFC tag 200 operates based on Type A.

In operation S135, the NFC reader 400 may communicatively connect to the NFC tag 200 based on a response signal of the NFC tag 200. In operation S136, the NFC reader 400 may perform tag read/write operations on the NFC tag 200.

A description is given in FIG. 8 as operation S134 is performed after operation S133, but the present disclosure is not limited thereto. For example, operation S133 and operation S134 may be performed independently.

Figure 9:
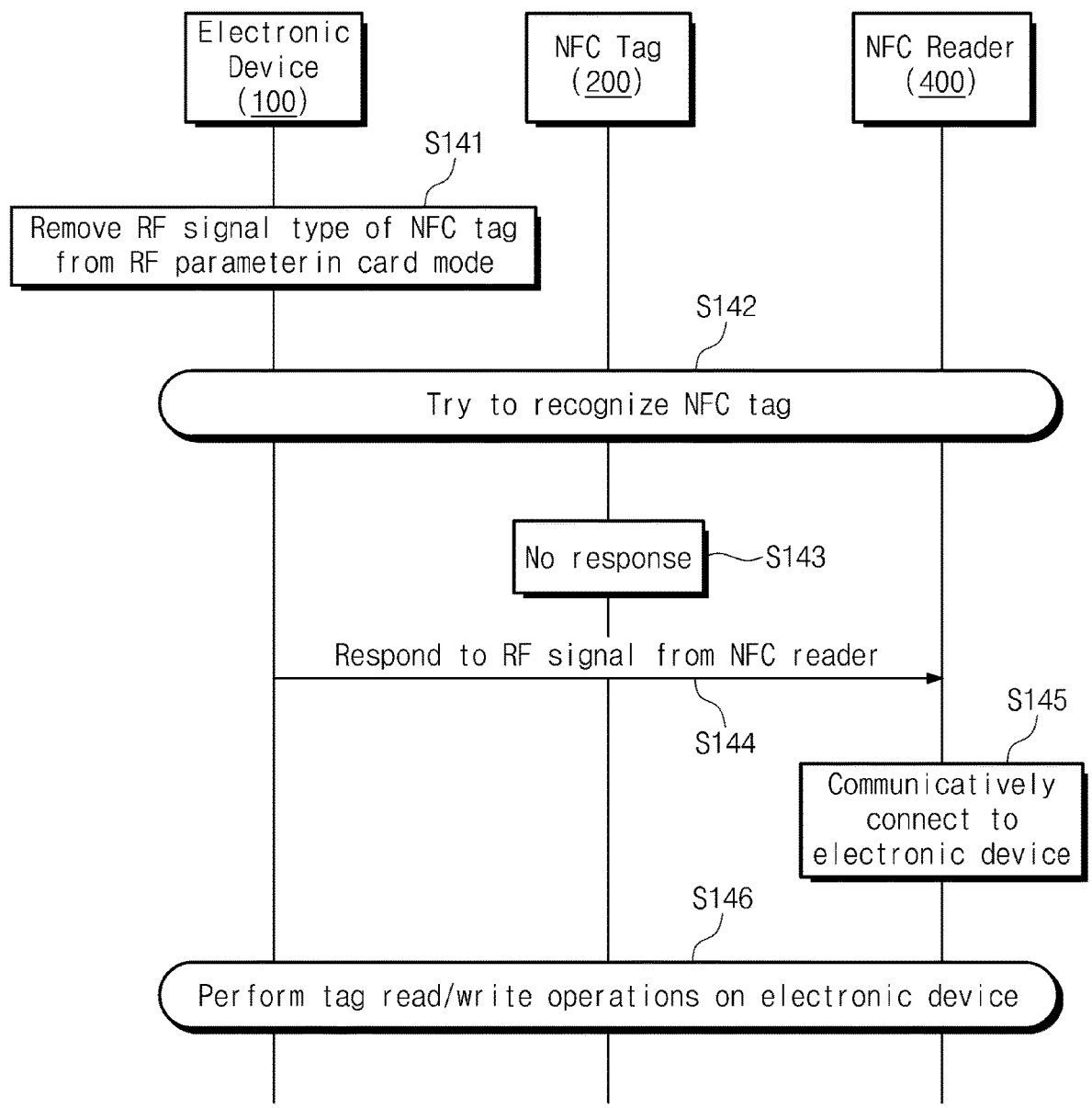
FIG. 9 illustrates another example in which an electronic device operates in a card mode based on an operation of an electronic device of FIG. 4.

FIG. 9 illustrates another example in which the electronic device 100 operates in the card mode based on the operation of the electronic device 100 of FIG. 4. Referring to FIGS. 7 and 9, in operation S141, the electronic device 100 may remove an RF signal type of the NFC tag 200 from an RF parameter in the card mode. In operation S142, the NFC reader 400 may try to recognize an NFC tag. In this case, the NFC reader 400 may send an RF signal based on Type B or Type F. When the NFC reader 400 sends an RF signal, in operation S143, the NFC tag 200 may not respond to the RF signal because the NFC tag 200 operates based on Type A. In operation S144, the electronic device 100 may respond to the RF signal from the NFC reader 400 because the electronic device 100 operates based on Type B and Type F.

In operation S145, the NFC reader 400 may communicatively connect to the electronic device 100 based on a response signal of the electronic device 100. In operation S146, the NFC reader 400 may perform tag read/write operations on the electronic device 100.

A description is given in FIG. 9 as operation S144 is performed after operation S143, but the present disclosure is not limited thereto. For example, operation S143 and operation S144 may be performed independently.

As described above, when the electronic device 100 operates based on an RF signal type different from an RF signal type of the NFC tag 200, even though the electronic device 100 approaches to the NFC reader 400, a collision event between the electronic device 100 and the NFC tag 200 may be prevented so as not to occur. Accordingly, the NFC reader 400 may communicatively connect to one of the electronic device 100 or the NFC tag 200.

Figure 10:
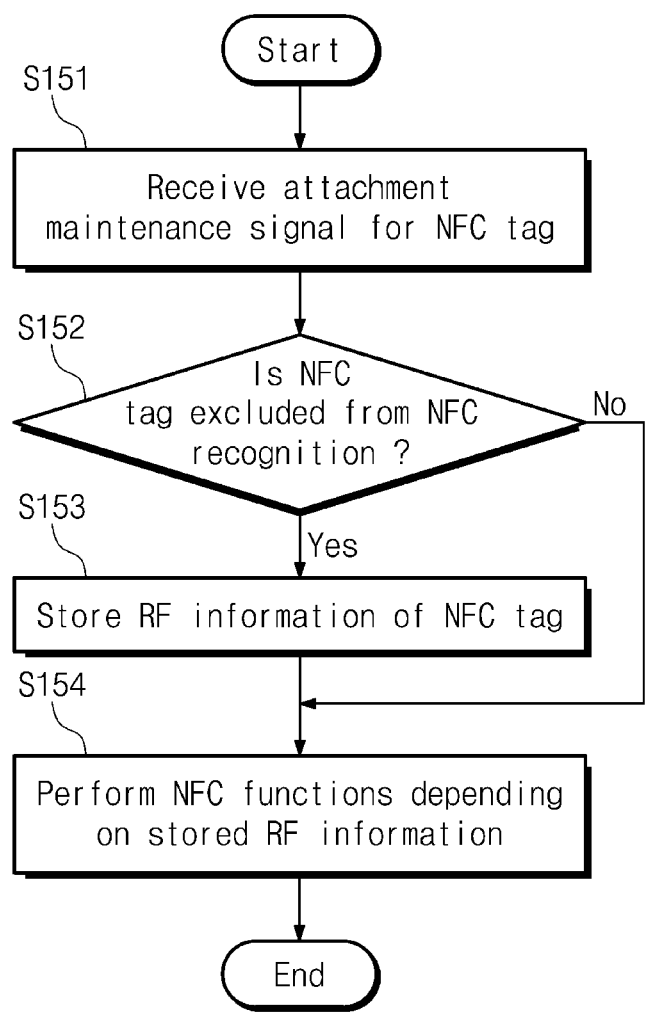
FIG. 10 is a flowchart illustrating another embodiment of an operation of an electronic device of FIG. 1 when an attachment of an NFC tag is maintained.

FIG. 10 is a flowchart illustrating another embodiment of an operation of the electronic device 100 of FIG. 1 when an attachment of the NFC tag 200 is maintained. Referring to FIGS. 1 and 10, in operation S151, the electronic device 100 may receive an attachment maintenance signal associated with the NFC tag 200. As such, the electronic device 100 may determine that the NFC tag 200 will be continuously attached to the electronic device 100.

In operation S152, the electronic device 100 may check whether to exclude the NFC tag 200 from NFC recognition. When the NFC tag 200 is determined to be excluded from the NFC recognition based on the check at S152, in operation S153, the electronic device 100 may store the RF information of the NFC tag 200. The RF information of the NFC tag 200 may be first RF information. For example, as described with reference to FIG. 3, when the RF information of the NFC tag 200 is in advance stored in the processor memory 111, the processor 110 may provide the RF information to the NFC chip 120. The NFC chip 120 may store the provided RF information in the NFC memory 121, such as in advance of receiving the same RF information from the NFC tag 200 in operation. For example, the RF information of the NFC tag 200 may include ATQA, UID, SAK, an RF signal type, etc.

In operation S154, the electronic device 100 may perform NFC functions depending on the stored RF information. For example, in the reader mode, when a response signal including RF information different from the stored RF information is received, the electronic device 100 may communicatively connect to an NFC tag sending the response signal.

Below, an example in which the electronic device 100 operates in the reader mode based on the operation of the electronic device 100 described with reference to FIG. 10 will be described with reference to FIGS. 5 to 11.

Figure 11:
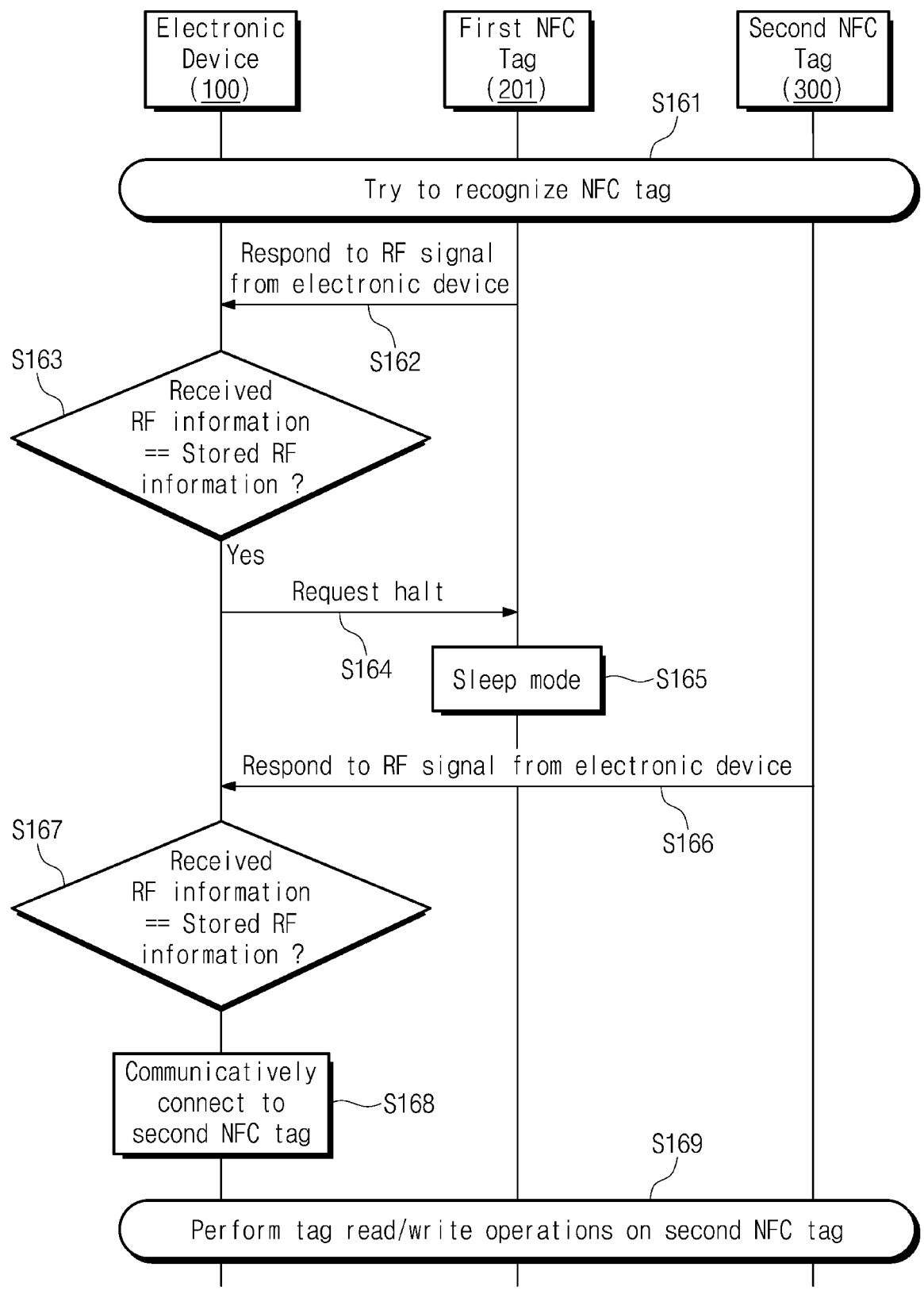
FIG. 11 illustrates an example in which an electronic device operates in a reader mode based on an operation of FIG. 10.

FIG. 11 illustrates an example in which the electronic device 100 operates in the reader mode based on the operation of FIG. 10. Referring to FIGS. 5 and 11, in operation S161, the electronic device 100 may try to recognize an NFC tag. In this case, the electronic device 100 may send an RF signal based on Type A, Type B, and Type F.

In operation S162, the first NFC tag 201 may respond to the RF signal from the electronic device 100 because the first NFC tag 201 operates based on Type A. As such, the first NFC tag 201 may provide RF information to the electronic device 100. The RF information may be considered first RF information. In operation S163, the electronic device 100 may compare the newly received first RF information and the RF information stored in advance. The newly received RF information may be the RF information of the first NFC tag 201. For example, the electronic device 100 may compare a UID derived from or present in the RF information to one or more UIDs stored already based on previously received RF information. However, the present disclosure is not limited thereto. For example, the electronic device 100 may compare RF information on the basis of at least one of the UID and the ATQA. As described with reference to FIG. 10, since the RF information stored in advance is the RF information of the first NFC tag 201, in operation S163, the electronic device 100 may determine that the received RF information and the stored RF information coincide with each other. In operation S164, the electronic device 100 may request an operation halt to the first NFC tag 201, i.e., to halt operations between the first NFC tag 201 and the electronic device 100. Depending on the operation halt, in operation S165, the first NFC tag 201 may enter a sleep mode. As such, the first NFC tag 201 may not respond to an RF signal anymore.

In operation S166, the second NFC tag 300 may respond to the RF signal from the electronic device 100. In this case, the second NFC tag 300 may send an RF signal based on one of Type A, Type B, and Type F. As such, the second NFC tag 300 may provide RF information to the electronic device 100. The RF information from the second NFC tag 300 may be second RF information. In operation S167, the electronic device 100 may compare the received RF information and the RF information stored in advance. For example, the electronic device 100 may compare UIDs or at least one of UIDs and ATQAs. The received RF information may be the RF information of the second NFC tag 300. Since the RF information stored in advance is the RF information of the first NFC tag 201, in operation S167, the electronic device 100 may determine that the received RF information and the stored RF information do not coincide with each other. As such, in operation S168, the electronic device 100 may communicatively connect to the second NFC tag 300. In operation S169, the electronic device 100 may perform tag read/write operations on the second NFC tag 300. In other words, the first RF information of the first NFC tag 201 may be stored in advance, and used to exclude the first NFC tag 201, whereas the second NFC information of the second NFC tag 300 may be accepted since it is not the first RF information.

FIG. 12 is a flowchart illustrating another embodiment of an operation of the electronic device 100 of FIG. 1 when an attachment of the NFC tag 200 is maintained. Referring to FIGS. 1 and 12, in operation S171, the electronic device 100 may receive an attachment maintenance signal associated with the NFC tag 200. As such, the electronic device 100 may determine that the NFC tag 200 will be continuously attached to the electronic device 100.

In operation S172, the electronic device 100 may check a priority of the electronic device 100 and the NFC tag 200. The electronic device 100 may display a check message through the display 130 and may receive a priority from the user. When the check message is displayed, the user may select one of the electronic device 100 and the NFC tag 200 to have priority over the other. When the electronic device 100 approaches to an NFC reader, the electronic device 100 or the NFC tag 200 selected as the priority by the user may first communicatively connect to the NFC reader. That is, based on the priority, either the NFC tag 200 communicatively connects to the NFC reader or the electronic device 100 communicatively connects to the NFC reader.

In operation S173, the electronic device 100 may change an UID value depending on the checked priority. In this case, the electronic device 100 may change an UID value of the electronic device 100 stored in the NFC memory 121 so that the priority set by the user is implemented. The electronic device 100 may change an UID value such that the electronic device 100 or the NFC tag 200 selected as a priority first communicatively connects to the NFC reader depending on an anti-collision algorithm (e.g., an anti-collision algorithm of ISO14443-3). For example, the electronic device 100 may change the UID value to a predetermined UID value depending on the priority, so that whichever of the electronic device 100 or the NFC tag 200 corresponds to the UID value changed to the predetermined UID value is selected as the priority. Alternatively, the electronic device 100 may change the UID value based on an UID value of the NFC tag 200 stored in the NFC memory 121 depending on the priority set by the user.

When the UID value of the electronic device 100 is different from the UID value of the NFC tag 200, a collision event may occur. The NFC reader may compare bits of the UID values from the most significant bit for the purpose of preventing collision. When different bit values are detected, the NFC reader may determine that a collision event occurs. In this case, the NFC reader may select an UID including "1" in the bits of the UID values at which the collision event occurs, such as when the other UID value has a most significant bit of "0". The NFC reader may communicatively connect to one of the electronic device 100 and the NFC tag 200 corresponding to the selected UID. When the UID value of the electronic device 100 is changed, the electronic device 100 or the NFC tag 200 selected as a priority by the user may first communicatively connect to the NFC reader depending on the anti-collision algorithm.

In operation S174, the electronic device 100 may set a response signal value of the electronic device 100 equal to a response signal value of the NFC tag 200. Here, the response signal may be RF information to be sent in response to an RF signal. For example, a response signal may be an ATQA. That is, the electronic device 100 may change an ATQA value so as to have the same value as the ATQA value of the NFC tag 200. In this case, in response to the RF signal, the electronic device 100 may send ATQA having the same value as the ATQA value sent from the NFC tag 200.

For example, when the ATQA value of the electronic device 100 is different from the ATQA value of the NFC tag 200, a collision event may occur. In this case, the NFC reader may not communicatively connect to either of the electronic device 100 and the NFC tag 200.

In operation S175, the electronic device 100 may perform NFC functions depending on the changed UID and the set response signal. For example, in the reader mode, the electronic device 100 may send the changed UID and the changed ATQA in response to an RF signal.

A description is given in FIG. 12 as operation S174 is performed after operation S173, but the present disclosure is not limited thereto. For example, operation S173 and operation S174 may be performed independently.

Figure 13A:
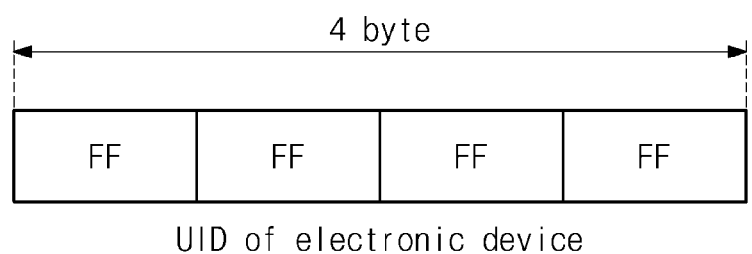
FIG. 13A illustrates an example of a changed UID value when an electronic device is selected as a priority depending on an operation of FIG. 12.
Figure 13B:
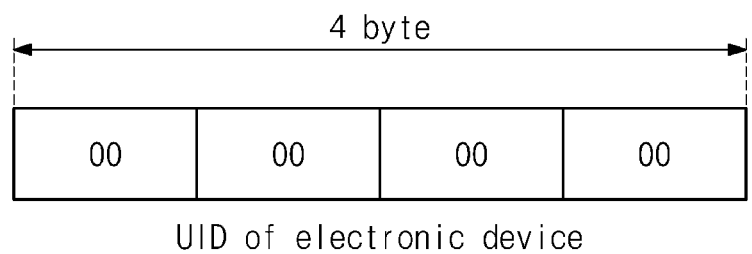
FIG. 13B illustrates an example of a changed UID value when an NFC tag is selected as a priority depending on an operation of FIG. 12.

FIG. 13A illustrates an example of a changed UID value when the electronic device 100 is selected as a priority depending on the operation of FIG. 12. FIG. 13B illustrates an example of a changed UID value when the NFC tag 200 is selected as a priority depending on the operation of FIG. 12. Referring to FIGS. 13A and 13B, an UID of the electronic device 100 may have a value set by 4 bytes. However, the present disclosure is not limited thereto. For example, the number of bytes of the UID may be variously changed.

Referring to FIG. 13A, when the electronic device 100 is selected as a priority, an UID value may be changed to "FF FF FF FF". That is, all bits of the UID may be changed to "1". In this case, the changed UID value may be a predetermined UID value. In the when all bits of the UID are changed to "1", even though collision occurs between an UID of the electronic device 100 and an UID of the NFC tag 200, the UID of the electronic device 100 may be selected according to the anti-collision algorithm. As such, the electronic device 100 may communicatively connect to an NFC reader.

Referring to FIG. 13B, when the NFC tag 200 is selected as a priority, an UID value may be changed to "00 00 00 00". That is, all bits of the UID may be changed to "0". In this case, the changed UID value may be a predetermined UID value. When all bits of the UID are changed to "0", even though collision occurs between an UID of the electronic device 100 and an UID of the NFC tag 200, the UID of the NFC tag 200 may be selected according to the anti-collision algorithm. As such, the NFC tag 200 may communicatively connect to an NFC reader.

Examples in which the electronic device 100 changes an UID value based on a predetermined UID value are illustrated in FIGS. 13A and 13B, but the present disclosure is not limited thereto. For example, when a collision event occurs, the electronic device 100 may change an UID value based on an UID value of the NFC tag 200 such that an UID of the electronic device 100 or the NFC tag 200 indicated as a priority is selected.

Below, an example in which the electronic device 100 operates in the card mode based on the operation of the electronic device 100 described with reference to FIG. 12 will be described with reference to FIGS. 7 and 14. For convenience of description, it is assumed that the electronic device 100 of the electronic device 100 and the NFC tag 200 is selected as a priority.

Figure 14:
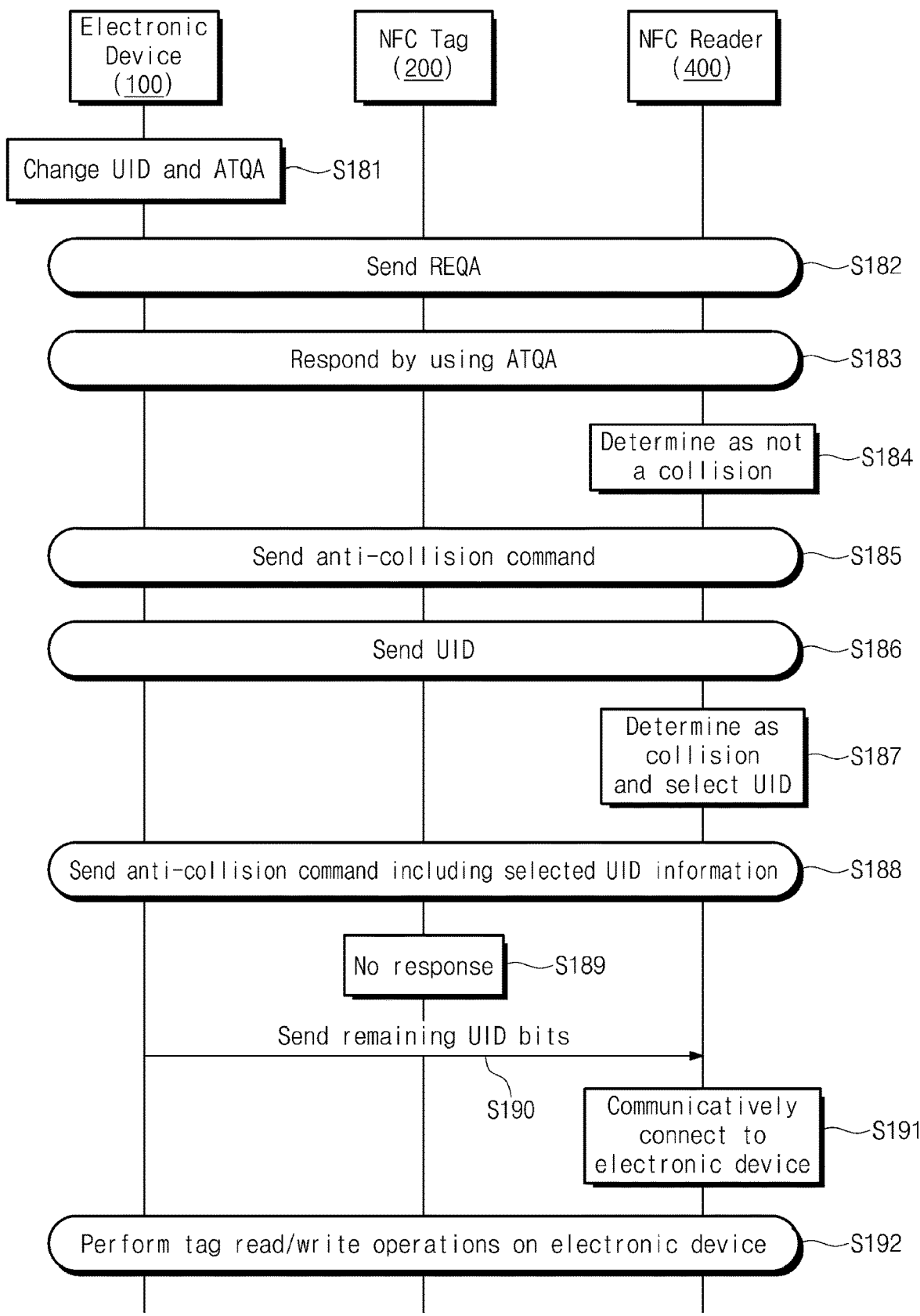
FIG. 14 illustrates an example in which an electronic device operates in a card mode based on an operation of FIG. 12.

FIG. 14 illustrates an example in which the electronic device 100 operates in the card mode based on the operation of FIG. 12. Referring to FIGS. 7 and 14, in operation S181, the electronic device 100 may change an UID value and an ATQA value. For example, as the electronic device 100 is selected as a priority over the NFC tag 200, the electronic device 100 may change all bits of the UID to "1". The electronic device 100 may change an ATQA value equal to the ATQA value of the NFC tag 200.

In operation S182, the NFC reader 400 may send REQA as an RF signal. When the REQA is received, in operation S183, each of the electronic device 100 and the NFC tag 200 may respond by using the ATQA. In this case, ATQA values of the electronic device 100 and the NFC tag 200 may be equal to each other. As such, in operation S184, the NFC reader 400 may determine that a collision event does not occur.

When a collision event does not occur, in operation S185, the NFC reader 400 may send an anti-collision command based on the determination at S184. In response to the anti-collision command, in operation S186, each of the electronic device 100 and the NFC tag 200 may send an UID to the NFC reader 400. In this case, UID values of the electronic device 100 and the NFC tag 200 may be different from each other. As such, in operation S187, the NFC reader 400 may determine that a collision event occurs and may select one of two UIDs. Since all bits of the UID of the electronic device 100 are "1", the NFC reader 400 may select the UID of the electronic device 100 depending on the anti-collision algorithm.

In operation S188, the NFC reader 400 may send the anti-collision command including the selected UID information. For example, the selected UID information may include a bit string containing bits from the most significant bit to a bit, at which a collision event occurs, from among bits of the selected UID. As such, since the selected UID information is different from the UID information of the NFC tag 200, in operation S189, the NFC tag 200 may not respond to the anti-collision command. Since the selected UID information is equal to the UID information of the electronic device 100, in operation S190, the electronic device 100 may send the remaining UID bits to the NFC reader 400. Afterwards, after additionally receiving a response signal from the electronic device 100, in operation S191, the NFC reader 400 may communicatively connect to the electronic device 100. In operation S192, the NFC reader 400 may perform tag read/write operations on the electronic device 100.

A description is given in FIG. 14 as operation S190 is performed after operation S189, but the present disclosure is not limited thereto. For example, operation S189 and operation S190 may be performed independently.

As described above, when the electronic device 100 changes a unique ID UID of the electronic device 100 and a response signal ATQA depending on a priority selected by the user, there may be prevented the event that both the electronic device 100 and the NFC tag 200 do not communicatively connect to the NFC reader 400 due to the occurrence of collision. Since the electronic device 100 or the NFC tag 200 selected as a priority by the user may communicatively connect to the NFC reader 400, the user may easily use the card mode of the electronic device 100. Also, since the NFC reader 400 may operate according to an existing anti-collision algorithm, the hardware or software of the NFC reader 400 may not be changed.

Figure 15:
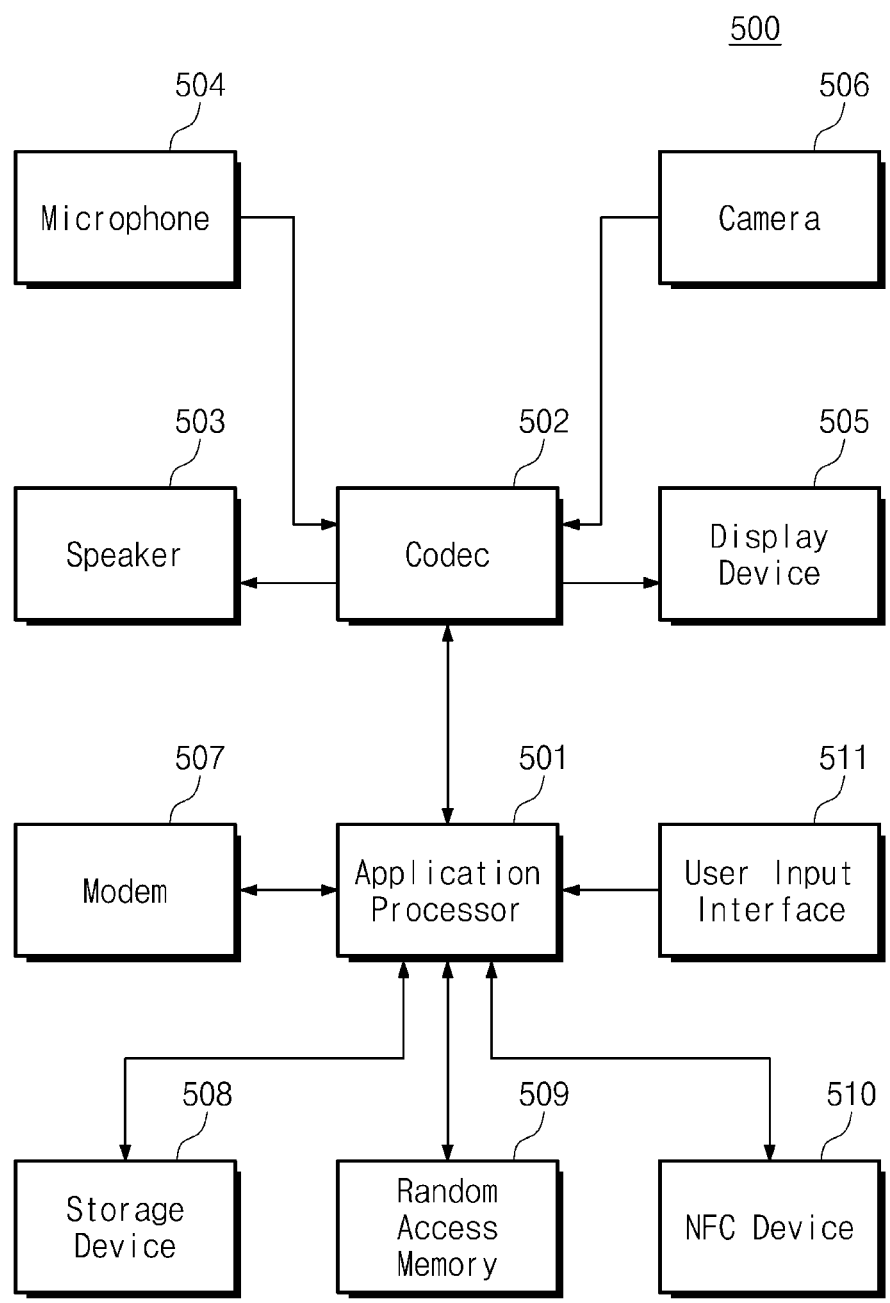
FIG. 15 is a block diagram illustrating a mobile device, according to an embodiment of the present disclosure.

FIG. 15 is a block diagram illustrating a mobile device 500 according to an embodiment of the present disclosure. Referring to FIG. 15, the mobile device 500 includes an application processor 501, a codec 502, a speaker 503, a microphone 504, a display device 505, a camera 506, a modem 507, a storage device 508, a random access memory 509, an NFC device 510, and a user input interface 511.

The application processor 501 may drive an operating system for operating the mobile device 500 and may drive various applications on the operating system. The application processor 501 may correspond to the processor 110 described with reference to FIGS. 1 to 14. The codec 502 may perform coding and decoding on a voice signal or an image signal. The codec 502 may perform a task allocated from the application processor 501 with regard to processing a voice signal or an image signal.

The speaker 503 may play a voice signal transferred from the codec 502. The microphone 504 may detect sound from the outside, may convert the detected sound into an electrical voice signal, and may output the voice signal to the codec 502. The display device 505 may play am image signal transferred from the codec 502. The display device 505 may correspond to the display 130 described with reference to FIGS. 1 to 14. The camera 506 may convert a scene in a field of vision into an electrical image signal and may output the image signal to the codec 502.

The modem 507 may communicate with an external device by wire or wirelessly. The modem 507 may transfer data to an external device in response to a request of the application processor 501 or may request data from the external device. The storage device 508 may be main storage of the mobile device 500. The storage device 508 may be used to store data for a long time and may retain data stored therein even though power is removed. The random access memory 509 may be used as a main memory of the mobile device 500. The random access memory 509 may be used for master devices, such as the application processor 501, the modem 507, the codec 502, etc. to temporarily store data.

The NFC device 510 may correspond to the NFC chip 120 described with reference to FIGS. 1 to 14. The NFC device 510 may perform NFC functions under control of the application processor 501. The application processor 501 and the NFC device 510 may perform NFC functions based on the operations described with reference to FIGS. 1 to 14. Accordingly, even though an NFC tag is attached to the mobile device 500, the mobile device 500 may perform NFC functions.

The user input interface 511 may include various devices that receive inputs from a user. For example, the user input interface 511 may include devices, which receive an input directly from a user, such as a touch panel, a touch screen, a button, and a key pad or devices, which indirectly receive results generated by actions of the user, such as an optical sensor, a proximity sensor, a gyroscope sensor, and a pressure sensor.

According to the present disclosure, when an electronic device to which an NFC tag is attached operates in a reader mode, the electronic device may recognize a different NFC tag and may perform read/write operations on the different NFC tag.

Also, according to the present disclosure, when the electronic device to which the NFC tag is attached operates in a card mode, a collision event between the electronic device and the NFC tag may be prevented so as not to occur. As such, the electronic device or the NFC tag may be read by an NFC reader.

Also, according to the present disclosure, when the electronic device to which the NFC tag is attached operates in the card mode, the electronic device or the NFC tag may be read by the NFC reader depending on a selection of a user.

While the inventive concept(s) of the present disclosure have been described with reference to exemplary embodiments thereof, it will be apparent to those of ordinary skill in the art that various changes and modifications may be made thereto without departing from the spirit and scope of the present disclosure as set forth in the following claims.

What is claimed is:

1. An operating method of an electronic device which includes a near field communication (NFC) device, the method comprising:
   detecting an attachment of a first NFC tag which uses a first radio frequency signal type;
   checking whether to exclude the first NFC tag from a recognition of the NFC device in response to the attachment of the first NFC tag; and
   when the first NFC tag is to be excluded from the recognition of the NFC device, setting, based on the checking, a radio frequency signal type so as not to respond to a radio frequency signal of the first radio frequency signal type.

2. The method of claim 1, further comprising:
   upon receiving a first radio frequency signal from an NFC reader which uses the first radio frequency signal type, not responding to the first radio frequency signal.

3. The method of claim 1, further comprising:
   upon receiving a second radio frequency signal from an NFC reader which uses a second radio frequency signal type different from the first radio frequency signal type, communicatively connecting to the NFC reader in response to the second radio frequency signal.

4. The method of claim 1, wherein the detecting of the attachment of the first NFC tag includes:
   checking an existence of the first NFC tag;
   when an attachment time of the first NFC tag is greater than a reference time, notifying of a long-term attachment of the first NFC tag; and
   after notifying of the long-term attachment, receiving an attachment maintenance signal.

5. The method of claim 1, wherein the checking whether to exclude the first NFC tag includes:
   displaying a notification for checking whether to exclude the first NFC tag from the recognition of the NFC device.

6. The method of claim 1, further comprising:
   when the first NFC tag is to be excluded from the recognition of the NFC device, setting based on the checking the radio frequency signal type so as to send a radio frequency signal of a second radio frequency signal type different from the first radio frequency signal type.

7. The method of claim 6, further comprising:
   when a response signal is received from a second NFC tag in response to the radio frequency signal of the second radio frequency signal type, communicatively connecting to the second NFC tag.

8. The method of claim 1, wherein the first NFC tag is a radio frequency card inserted in a case of the electronic device.

9. An electronic device, comprising:
   a near field communication (NFC) device; and
   a processor that executes instructions, wherein, when executed by the processor, the instructions cause the electronic device to:
   detect an attachment of a first NFC tag which uses a first radio frequency signal type;
   check whether to exclude the first NFC tag from a recognition of the NFC device in response to the attachment of the first NFC tag; and
   when the first NFC tag is to be excluded from the recognition of the NFC device, set, based on the checking, a radio frequency signal type so as not to respond to a radio frequency signal of the first radio frequency signal type.

10. The electronic device of claim 9, wherein, when executed by the processor, the instructions further cause the electronic device to:
    upon receiving a first radio frequency signal from an NFC reader which uses the first radio frequency signal type, not respond to the first radio frequency signal.

11. The electronic device of claim 9, wherein, when executed by the processor, the instructions further cause the electronic device to:
    upon receiving a second radio frequency signal from an NFC reader which uses a second radio frequency signal type different from the first radio frequency signal type, communicatively connect to the NFC reader in response to the second radio frequency signal.

12. The electronic device of claim 9, wherein detection of the attachment of the first NFC tag includes:
    checking an existence of the first NFC tag;
    when an attachment time of the first NFC tag is greater than a reference time, notifying of a long-term attachment of the first NFC tag; and
    after notifying of the long-term attachment, receiving an attachment maintenance signal.

13. The electronic device of claim 9, further comprising:
    a display, wherein checking whether to exclude the first NFC tag includes:
    displaying on the display a notification for checking whether to exclude the first NFC tag from the recognition of the NFC device.

14. The electronic device of claim 9, wherein, when executed by the processor, the instructions further cause the electronic device to:
    when the first NFC tag is to be excluded from the recognition of the NFC device, set based on checking the radio frequency signal type so as to send a radio frequency signal of a second radio frequency signal type different from the first radio frequency signal type, and
    when a response signal is received from a second NFC tag in response to the radio frequency signal of the second radio frequency signal type, communicatively connect to the second NFC tag.

15. The electronic device of claim 9, further comprising:
    a case, wherein the first NFC tag is a radio frequency card inserted in a case of the electronic device.

* * * * *